US012287901B2

(12) United States Patent  (10) Patent No.: US 12,287,901 B2
Kirchner et al.  (45) Date of Patent: Apr. 29, 2025

(54) SYSTEM COMPRISING A MAIN DEVICE, A SECONDARY DEVICE AND A GARMENT AS WELL AS AN OPERATING METHOD

(71) Applicant: Workaround GmbH, Munich (DE)

(72) Inventors: Matthias Kirchner, Munich (DE); Sebastian Petruch, Munich (DE); Moritz Eder, Munich (DE)

(73) Assignee: Workaround GmbH, Munich (DE)

( * ) Notice: Subject to any disclaimer, the term of this patent is extended or adjusted under 35 U.S.C. 154(b) by 718 days.

(21) Appl. No.: 17/489,975

(22) Filed: Sep. 30, 2021

(65) Prior Publication Data

US 2022/0100895 A1  Mar. 31, 2022

(30) Foreign Application Priority Data

Sep. 30, 2020  (DE) ...................... 10 2020 125 554.3

(51) Int. Cl.
G06F 21/62 (2013.01)
G06F 1/16 (2006.01)
G06F 21/31 (2013.01)
H04Q 9/00 (2006.01)

(52) U.S. Cl.
CPC .......... *G06F 21/6245* (2013.01); *G06F 1/163* (2013.01); *G06F 21/31* (2013.01); *H04Q 9/00* (2013.01); *H04Q 2209/883* (2013.01)

(58) Field of Classification Search
CPC ...... G06F 21/6245; G06F 21/31; G06F 1/163; H04Q 9/00; H04Q 2209/883
See application file for complete search history.

(56) References Cited

U.S. PATENT DOCUMENTS

2016/0125348 A1  5/2016 Dyer et al.
2016/0161301 A1*  6/2016 Guenther ............... G01D 11/30
702/150

FOREIGN PATENT DOCUMENTS

DE  102015111506 A1  4/2016
DE  102017203495 A1  9/2018
EP  3346433 A1  7/2018

(Continued)

OTHER PUBLICATIONS

Video Titled "Work glove with scanning function" by: Simply Genius (Year 2016). 2 pages. https://www.mdr.de/video/mdr-videos/c/video-71712.html (video is in German language).

(Continued)

*Primary Examiner* — Matthew T Henning
(74) *Attorney, Agent, or Firm* — Dilworth IP, LLC

(57) ABSTRACT

A method for operating a system including a main device, a secondary device, which is a sensor and/or information device, and a garment for receiving the secondary device is shown. The method includes steps of, logging by the main device of the usage events triggered on the system in a usage log, storage of the usage log on the main device and/or the secondary device, creation of usage statistics based on the usage log, recognition of a terminating event by the main device, the terminating event displaying the end of the current user's use of the system, and automatic deletion of the usage log and/or the usage statistics by the main device if the terminating event has been recognised. Moreover, a system including a main device, a secondary device and a garment is shown.

21 Claims, 2 Drawing Sheets

(56) References Cited

FOREIGN PATENT DOCUMENTS

GB  2567214 A  4/2019

OTHER PUBLICATIONS

Oliver Voß "Founder's Prize Two tinkerers with a vision", Jan. 2, 2016, 13 pages.
Thomas Kircher "the purpose justifies the means", May 6, 2018, 5 pages.
Wikipedia "General Data Protection Regulation", May 25, 2018, 29 pages.

* cited by examiner

SYSTEM COMPRISING A MAIN DEVICE, A SECONDARY DEVICE AND A GARMENT AS WELL AS AN OPERATING METHOD

FIELD OF THE DISCLOSURE

The disclosure relates to a method for operating a system comprising a main device, a secondary device, which is a sensor and/or information device, and a garment for receiving the secondary device. The disclosure also relates to such a system comprising a main device, a secondary device and a garment on which the secondary device is fastenable.

BACKGROUND

Wearable sensor and/or information systems in which a secondary device can be fastened to the user by means of a garment and communicates via a main device are known. Here, secondary devices are usually only developed and configured for communicating with the main device in order to keep the design of the secondary device as small as possible so that it can be worn unobtrusively.

Such systems serve to support a user in undertaking activities, for example, because a sensor unit such as barcode scanner is contained in the secondary device.

Logs and statistics on use and thus the user's activity can be produced by such systems to provide the user with the opportunity to check and analyse the user's activities. The user can also be motivated by such statistics.

Such systems comprising a secondary device and a main device are not usually used solely by one single user so that logging and producing usage statistics leads to a problem with protecting sensitive or other data of the user.

SUMMARY

Thus, there is provided such a system as well as a method for operating such a system which ensures the protection of the user's data despite creating usage statistics.

The object is solved by means of a method for operating a system comprising a main device, a secondary device, which is a sensor and/or information device, and a garment for receiving the secondary device. The method comprises the following steps:
a) logging by the main device of the usage events triggered on the system in a usage log,
b) storage of the usage log on the main device and/or the secondary device,
c) creation of usage statistics based on the usage log,
d) recognition of a terminating event by the main device, said terminating event displaying the end of the current user's use of the system, and
e) automatic deletion of the usage log and/or the usage statistics by the main device if the terminating event has been recognised.

By automatically deleting the usage log and/or the usage statistics, sensitive or other data of the user is deleted reliably and securely and is not therefore accessible to the subsequent user or to a superior or similar person after use. The protection of sensitive data is thus ensured.

In particular, all instances and backups of the usage log and/or the usage statistics are reliably and securely deleted by the main device, both from the main device and from the secondary device. To this end, for example, the main device sends a delete command to the secondary device.

The deletion occurs, for example, immediately after recognising the terminating event automatically and/or without needing a user input, such as a confirmation.

The log can contain, for example, at least a date stamp and the usage event for each logged usage event.

For example, usage events that are different in the usage statistics and contained in the usage log are added together, recorded and/or put in relation to each other.

The usage statistics are generated by the main device in particular.

In an embodiment, the user's different activities are recognised using the usage log, in particular wherein the usage statistics include the time taken by the different activities and/or the relation between the different activities, thus enabling the user to receive particularly precise and easy-to-understand usage statistics.

The activities can be also recognised by the main device.

In an embodiment of the disclosure, the usage log and/or the usage statistics are stored solely on the main device and/or on the secondary device, thus improving data protection further.

In particular, the usage log and/or the usage statistics or related parts thereof are not transmitted from the main device or the secondary device to a further device of the system, such as a control system, or another additional device outside the system. Individual events or sensor data of the secondary system are not regarded as part of the usage log.

To inform the user about the user's activity, the main device and/or secondary device output the usage statistics to the user by means of a display and/or another output means.

For example, the main device is a wearable smart device, particularly a smartphone, a tablet, a laptop, a smart watch or smart glasses.

In an embodiment, a statistics mode of the system is activated to enable logging, wherein the statistics mode is activated by a user input and/or automatically if the main device recognises a start event, particularly wherein the start event is one or several of the following events:
removal of the secondary device or the main device from a charging station of the system,
successful establishment of a communication link of the main device to the secondary device,
actuation of the input means,
activation of a sensor unit of the secondary device or an ambient sensor of the main device,
capture of predetermined sensor data by means of the sensor unit of the secondary device and/or by means of an ambient sensor of the main device, particularly the reading of a predetermined barcode,
insertion of the secondary device in a holder of the garment, and
authentication of the user on the main device.

As a result of these start events, it is possible to recognise with a high probability if the system is used by a new user, i.e., if a change in user has taken place.

For example, the secondary unit transmits the signals to the main device which displays the occurrence of one of the above events.

The statistics mode may run alongside the normal productive mode and may by during operation in the normal productive mode. If the statistics mode is not activated, logging does not take place.

The authentication can occur by means of security sensors, such as a fingerprint sensor or a facial recognition sensor of the main device.

To be able to determine the end of the user's activity reliably, the terminating event may be one or several of the following events:

- connection of the secondary device and/or the main device to a power supply, in particular insertion of the secondary device and/or the main device into a charging station of the system,
- removal of the secondary device from the garment,
- actuation of a user input on the secondary device or main device which ends the productive mode and/or the statistics mode,
- activation of a sensor unit of the secondary device or an ambient sensor of the main device,
- capture of predetermined sensor data by means of the sensor unit of the secondary device and/or by means of an ambient sensor of the main device, particularly the reading of a predetermined barcode,
- inactivity of the secondary device for a predefined period of time, and
- disconnection of the communication link of the secondary device to the main device permanently.

Here, a communication link is considered to be permanently disconnected if this has been disconnected by a user input or if a predefined period of time elapses following a disconnection.

The secondary device is considered to be inactive if it does not receive commands from the main device, the input means is not actuated and/or the secondary device is not moved, in particular wherein a movement or the absence of movement is detected by a motion sensor of the secondary device, such as an acceleration sensor.

The predefined period of time runs, for example, from the last command, the last actuation of the input means and/or the last movement and is reset with each new command, each actuation of the input means and/or each movement.

To increase data security further, the usage log and/or usage statistics on the main device may be stored in a secure area.

The secure area may be a storage area of the storage device of the main device which is only accessible for analysing usage events through the application, a dedicated security chip of the main device and/or an enclave of the processor of the main device.

In an embodiment, the secondary device has a sensor unit, in particular an optical sensor, by means of which sensor data, in particular a representation of a barcode, is generated and/or that the secondary device has a display on which content is displayed. As a result, the system can support the user versatility, for example in identifying and tracking components and products.

To simplify the use of the system greatly, the garment and/or the secondary device can have at least one input means, particularly a trigger, wherein at least one function of the secondary device, in particular the sensor unit, is triggered through the actuation of the input means when the secondary device is received in the garment.

In an embodiment, a usage event is a usage event triggered by a user input, a usage event triggered by the use of the main device and secondary device and/or an automatic usage event, for example regular measurement of the ambient temperature. In this way, a diverse and detailed log of the user's activity can be produced.

For example, the ambient temperature is determined by means of a temperature sensor of the secondary device and/or the main device.

To log the active activities of the user, a usage event triggered by a user input may be an actuation of the secondary device, in particular a triggering of the sensor unit of the secondary device, an actuation of the input means and/or a confirmation for read sensor data, particularly a barcode.

The read sensor data, the barcode (and its representation) is transmitted from the secondary device to the main device, wherein the main device executes a check as to whether the sensor data and the barcode correspond to the expected sensor data and barcode and then confirms the sensor data and the barcode in the event of these corresponding.

The main device can also transmit the sensor data and the barcode to the control system for the checking. To this end, the main device is connected to a control system for transmitting data wired or wirelessly.

For example, a step of the user and/or the user's distance travelled is a usage event triggered by the use of the main and secondary device. As a result, the user's secondary actions can be logged.

The user's steps can be detected by an acceleration sensor of the main device and/or the secondary device.

The distance travelled can be determined by location sensors of the main device and/or secondary device. The evaluation of this sensor data can be executed in each instance by the main device.

To also log social events, the secondary device and/or the main device, in particular via one of their wireless communication modules, can detect an encounter with a smart device, in particular a smart phone, a secondary device and/or a main device of another system and this encounter can constitute a usage event.

Within the scope of this disclosure, an encounter is deemed to have occurred if the devices of different users are spaced less than a predetermined distance apart from each other for predefined period of time. An encounter is a usage event triggered by the use of the main and secondary device.

In an embodiment, the main device and/or the secondary device output a cue, in particular an acoustic, optical and/or haptic cue, if the number of usage events of a certain type in the usage log fulfil a condition predetermined for this type, e.g., a predetermined threshold is reached or exceeded.

As a result, the user can be motivated to produce further similar usage events, to work more efficiently or to increase work safety, e.g., by maintaining a minimum distance.

The condition, in particular the threshold, for outputting a cue may be set by the user, for example at the main device or the secondary device, and/or the condition, in particular the threshold, for outputting a cue may be set by the control system, for example by a superior or another user of the control system.

To simplify the operation of the system greatly, the main device can establish a communication link to the secondary device as soon as the secondary device is separated from a power supply, in particular is removed from a charging station of the system.

For example, the secondary device in the statistics mode is connected, in particular connected wirelessly, for data transmission to the main device.

The object is also solved by a system comprising a main device, a secondary device and a garment, in particular a glove, on which the secondary device is fastenable, wherein the main device and/or the secondary device are configured to execute the method described previously.

The features and advantages described for the method equally apply to the system and vice versa.

It is also of course self-evident that the individual components of the device are each configured to also execute the steps executed by them in the method.

For example, the system has a charging station and/or a control system for the secondary device and/or the main device.

BRIEF DESCRIPTION OF THE DRAWINGS

Additional advantages and features of the disclosure can be found in the following description and in the attached drawings to which reference is made. In the drawings.

DETAILED DESCRIPTION

Lists having a plurality of alternatives connected by "and/or", for example "A, B and/or C" are to be understood to disclose an arbitrary combination of the alternatives, i.e., the lists are to be read as "A and/or B and/or C". The same holds true for listings with more than two items.

Figure 1:
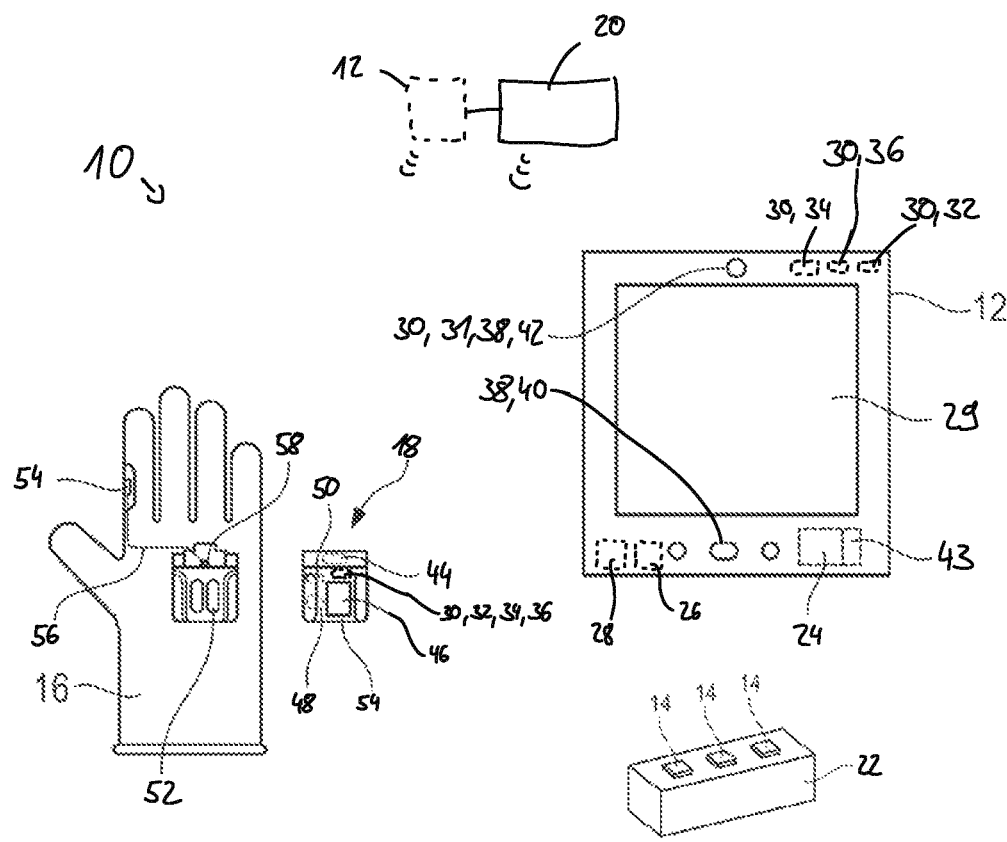
FIG. 1 shows a system according to the disclosure comprising a secondary device according to the disclosure in a schematic view.

FIG. 1 shows schematically a system 10 that comprises a main device 12, a garment 16, in the shown embodiment a glove, and a secondary device 18.

The system 10 thus constitutes a sensor and/or information system and is designed for industrial use. It is therefore suitably robust for continuous operation.

Moreover, the system 10 has a control system 20 and a charging station 22 for the or several secondary devices 18.

The main device 12 is a wearable smart device, preferably a smartphone. However, the main device 12 can also be a tablet, a laptop, a smart watch or smart glasses.

In principle, the main device 12 can also be a stationary main device, for example a stationary computer, also referred to as a gateway (represented as dashed lines).

The main device 12 has a control unit 24 comprising a first communication module 26, a second communication module 28, a display 29 and a secure area 43.

The first communication module 26 is configured to communicate with the control system 20. The first communication module 26 is, for example, a WLAN module or a LAN module. The communication between the main device 12 and the control system 20 can also occur through software components such as a mobile device management system, for example SOTI or Airwatch.

The second communication module 28 is configured to communicate wirelessly with the secondary device 18. For example, the second communication module 28 is configured to communicate with the secondary device 18 via short range radio technology such as Bluetooth, in particular Bluetooth Low Energy.

Each specific main device 12 can be connected wirelessly and/or wired to the control system 20, such as an enterprise-resource-planning system (ERP system), for example on a local server or a cloud server, and can write data in or obtain data from the database or the ERP system.

Moreover, the main device 12 can have ambient sensors 30, for example a camera 31, an acceleration sensor 32, a temperature sensor 34, or a location sensor 36 or security sensors 38, for example a fingerprint sensor 40 or a facial recognition sensor 42. The facial recognition sensor 42 can be formed in part by the camera 31 of the main device 12.

The location sensor 34 can be configured as a receiver of a GNSS system (GPS, Galileo, GLONASS, Beidou) and/or as an indoor positioning sensor, for example as a result of the communication modules 26, 28 interacting with the base stations.

The secure area 43 of the control unit 24 is, for example, a given storage area of the storage device of the control unit 24 or the main device 12 which is only accessible through the application for analysing usage events that are executed by the control unit 24 and in the method described in the following:

The secure area 43 may also be a dedicated security chip of the main device 12 and/or an enclave of the processor of the main device 12.

In the shown embodiment, the secondary device 18 is a sensor and information device and has a sensor unit 44, a display 46, a control unit 48 with a communication module 50 and a power storage medium, such as an accumulator.

However, it should be noted that this embodiment is purely exemplary for illustration purposes. Alternatively, the secondary device 18 can also be designed purely as an information device that does not have a sensor unit 44, but rather a display for displaying information. A purely sensor device without a display is also conceivable.

In the shown embodiment, the sensor unit 44 is an optical sensor, for example a camera. The optical sensor is configured in particular to read barcodes and to transmit a representation of the barcode to the control unit 48.

It is also conceivable that the sensor unit 44 has other sensor units, such as an RFID reader, a camera, touch sensors or acceleration sensors in addition to or instead of the optical sensor.

In general, the control unit 48 of the secondary device 18 has considerably lower computing power and a considerably smaller storage capacity than the control unit 24 of the main device 12.

In particular, the control unit 48 of the secondary device 18 is an embedded system. Moreover, the secondary device 18 has a configuration, the functions and the characteristics of the secondary device 18 defined. The configuration is stored, for example, as a configuration file in the control unit 48.

The communication module 50 is configured to communicate and exchange data with the main device 12, more specifically with the second communication module 28 of the main device 12, by means of short-range radio technology, for example via Bluetooth, in particular Bluetooth Low Energy, and/or via WLAN.

The communication module 50 and in particular the entire secondary device 18 is not configured directly, for example, to communicate with the control system 20 or the Internet, i.e., without an intermediate step via the main device 12.

Furthermore, the secondary device 18, like the main device 12, can also have ambient sensors 30 that are provided with the same reference signs for simplicity. For example, the secondary device 18 has an acceleration sensor 32, a temperature sensor 34 or a location sensor 36.

Figure 2:
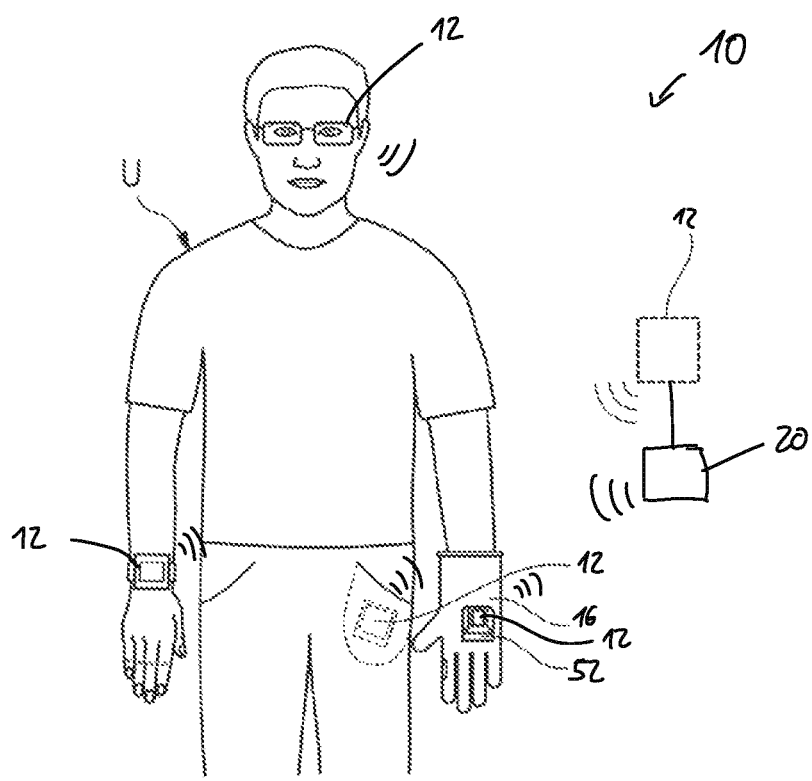
FIG. 2 shows the system according to FIG. 1 during use by a user, i.e., in the productive mode and/or statistics mode.

As shown in FIG. 2, the secondary device 18 can be fastened to the body of a user U by means of the garment 16. The secondary device 18 or the combination of the garment 16 and the secondary device 18 is thus what is termed a "wearable".

For this purpose, the garment 16 has a holder 52 in which the secondary device 18 can be fastened and removed without tools in a repeatable manner.

The garment 16 can also have an input means 54, for example a trigger for the secondary device 18. The trigger or the input means 54 can be provided on a finger of the glove. It is also conceivable that said at least one input means 54 or one or several additional input means 54 are provided on the holder 52.

By means of at least a cable 56 and at least a contact 58 in the holder 52, the input means 54 is connected to the secondary device 18 as soon as it is inserted in the holder 52.

Alternatively, or in addition to the input means 54 on the garment 16, the display 46 of the secondary device 18 can be configured as an input means. For example, the display 46 is configured as a touch display.

If the system 10 is not being used, the secondary device 18 is inserted into the charging station 22, i.e., connected to a power supply via corresponding contacts.

At the start of a shift, the user U and each of the user's colleagues take at least one secondary device 18 and, if applicable, one wearable main device 12 from a corresponding charging station 22.

For example, the user U is an assembly worker in production or a logistics worker in a warehouse.

Figure 3:
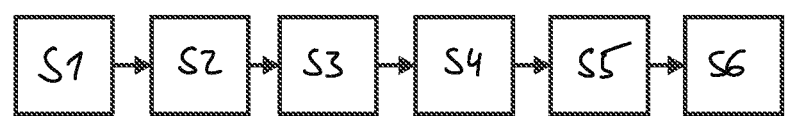
FIG. 3 shows a flow diagram of a potential operation of the system according to FIG. 1.

FIG. 3 shows a flow diagram of normal use initially without logging. Thus, in step S1, the user U removes a secondary device 18 from the charging station and inserts it into the holder 52 on the garment 16 that is being worn by the user.

Subsequently, the secondary device 18 forms a connection, for example short-range radio connection, to the main device 12 by means of the communication module 50 either automatically or as a result of an input of the user U (step S2).

The secondary device 18 is then in the productive mode and can be used now by the user U for the intended application of the user U (step S3).

The productive mode is understood to mean, for example, that all functions of the secondary device 18 are activated and available which the user U requires for the application, i.e., the activity intended for the user in the company.

The productive mode is activated, for example, by the control unit 48 as soon as a connection for data transmission has been established to the main device 12.

During use, the user can trigger the sensor unit 44 and read barcodes and generate sensor data, for example, by actuating the input means 54; said sensor data is then transmitted from the secondary device 18 to the main device 12 and on to the control system 20 (step S4).

The main device 12 and/or the control system 20 then checks whether the sensor data, such as the barcode, corresponds to the sensor data and barcode expected at this time. In the event of this corresponding, the sensor data and the barcode are confirmed by the main device 12 and/or the control system 20 to the secondary device and/or the main device 12 (step S5).

For example, it is expected at a certain time in a process that a barcode of a certain product will be read. If the barcode read at that time corresponds to the expected barcode of the product, then a confirmation is given. Of course, this principle can also be applied to other sensor data, for example the location of the user U.

Content on the display 46 can also be displayed, for example the previously described confirmation, as a result of a command by the main device 12 or the control system 20 or even after reading a corresponding barcode or after receiving sensor data.

It is of course also conceivable that other functions of the secondary device 18 are triggered by actuating the input means 54. Which action is triggered is determined, for example, by the configuration of the secondary device 18.

At the end of each shift at the latest, the user U places the secondary devices 18 and the main device 12 back into the corresponding charging station 22 (step S6), i.e., the secondary device 18 or the main device 12 is connected to a power supply. This ends the productive mode.

The productive mode can also be ended in various other ways. For example, the productive mode already ends if the secondary device 18 is removed from the garment 16, i.e., is removed from the holder 52.

It is also conceivable that the control unit 48 ends the productive mode if the communication link between the secondary device 18 and the main device 12 is disconnected permanently, e.g., as a result of a user input or the expiry of a predefined period of time following a disconnection.

It is of course conceivable that the productive mode is also ended intentionally as a result of a corresponding input of the user U on the secondary device 18 or on the main device 12.

The productive mode can also be ended if the secondary device 18 has not been used for a predefined period of time.

The secondary device 18 is then not regarded as being used, for example, if it does not receive any commands from the main device 12, the input means 54 is not actuated and/or the secondary device 18 has not been moved.

A movement or the absence of movement by the secondary device 18 can be detected by the acceleration sensor 32 of the secondary device 18.

The predefined period of time runs, for example, from the last command, the last actuation of the input means 54 and/or the last movement and is reset with each new command, each actuation of the input means and/or each movement. For example, this period of time is 15 minutes or 30 minutes.

In particular, the secondary device 18 and the main device 12 are not personalised. This means that the user U can take and use another main device 12 and another secondary device 18 at the start of the next shift.

During a shift, the user U thus executes a multitude of activities that generate a corresponding amount of sensor data.

As an illustration, the example of a warehouse worker as user U in the logistics sector has been described. The user U must take products from the warehouse (what is termed picking) and prepare these products for dispatch (preparing for dispatch). To this end, a barcode is to be read both when taking a product from the shelf in the warehouse as well as when being preparing for dispatch when the product is placed in the packing container.

The previously described confirmation by the main device 12 and/or the control system 20 may be in this case, for example, that there is a check as to whether the product taken from the shelf, or rather its barcode, corresponds to a product of the delivery currently being prepared.

In the case of picking, the user U is moving to reach the stock in question. It is also conceivable that parts of the warehouse are in an external area, a cooled area and/or a refrigerated area so that typically a temperature gradient also exists between the different areas of a warehouse. In the case of preparing for dispatch, however, the user U is not moving, but standing in an area of the packing station used for dispatching.

Figure 4:
FIG. 4 shows a flow diagram of a method according to the disclosure using the system according to FIG. 1.

To be able to carry out an evaluation of the different activities of the user U using usage statistics, the method shown as a flow diagram in FIG. 4 is now executed by the system 10, for example the main device 12 and the secondary device 18, in addition to the typical use in the productive mode.

To create usage statistics, the relevant events must be initially logged. To activate this logging and also the creation of the usage statistics, a statistics mode of the system 10 is activated initially (step P1).

The statistics mode can be activated manually on the one hand by a user input of the user U on the main device 12, on the secondary device 18 or even on the control system 20.

The statistics mode can also be activated however automatically if the system 10, in particular the main device 12, recognises a start event. A start event is understood to mean that this event displays the start of a new shift and/or a change of user or that is probable.

For example, the start event is already the removal of the secondary device 18 and/or the main device 12 from the charging station 22 so that the statistics mode is already activated in step S1.

Also, the insertion of the secondary device 18 into the holder 52 can be used as a start event.

Similarly, the successful establishment of the communication link between main device 12 and the secondary device 18 can be regarded as a start event so that the statistic mode occurs in step S2.

It is however also conceivable that the statistics mode is first activated with the actuation of the input means 54, for example with its actuation for the first time and/or as a result of a given actuation pattern. As a result, this avoids the inclusion of any set-up time or shift briefings already in the usage statistics.

The activation of the sensor unit 44 of the secondary device 18 or at least one of the ambient sensors 30 of the main device 12, in particular the camera 31, can be the start event.

It is also conceivable that the statistics mode is activated by capturing predetermined sensor data by means of the sensor unit 44 of the secondary device 18 and/or by means of one of the ambient sensors 30 of the main device 12 which then constitutes the start event.

For example, the user U reads a predetermined barcode with the sensor unit 44 or the camera 31 to start the statistics mode.

An authentication of the user U on the main device 12 can also be used as a start event. To this end, the authentication can occur, for example, by means of the security sensors 38, i.e., by a fingerprint or by a facial recognition sensor 42 (typically a camera with corresponding evaluation).

In all cases, the statistics mode is activated during the normal productive mode and runs parallel to it so that the communication link exists between the main device 12 and the secondary device 18. Thus, also in the statistics mode, the secondary device 18 is connected to the main device 18 for data transmission wirelessly.

During use (step S3) of the system 10, i.e., during the activity of the user U, the main device 12 logs all or predetermined usage events on the system 10 (step P2).

The log contains, for example, the usage event and a date stamp when the specific usage event occurred.

To this end, a usage event can be, for example, a usage event triggered by an input of the user U. For example, this is an actuation of the secondary device 18, wherein the user U actuates the input means 54 and as a result the sensor unit 44 of the secondary device 18 is triggered.

The confirmation for read sensor data and its receipt, can also be a usage event, e.g., the previously described confirmation of a read and expected barcode.

Usage events can also be brought about by using the main device 12 and the secondary device 18 without a user input. For example, the movement of the user U is determined by means of the ambient sensors 30, e.g., the acceleration sensors 32. To this end, the number of steps and each step can be logged as usage events by means of the acceleration sensor 32 or the change in location and the resulting distance travelled can be logged as usage events by means of the location sensor 36.

In doing so, the evaluation of the ambient sensors 30 can take place in the main device 12.

A further usage event that is triggered by using the system is encountering other users U.

Encounters with other users U are recognised owing to the fact that the secondary device 18 and/or the main device 12 are moved near to another secondary device 18, main device 12 or another smart device, such as a mobile phone outside of the system.

An encounter is then assumed if the devices were spaced less than a predetermined distance apart from each other for predefined period of time.

The distance of the main device 12 and/or the secondary device 18 to the other devices can be determined by means of the wireless communication modules 28 and 50 using the signal strength.

Such recognition of encounters using signal strengths of wireless communication modules is well known, for example in the form of social distancing apps for smartphones.

Usage events, i.e., entries in the usage log, can also occur as a result of automatic events. For example, by regularly logging a sensor value of the ambient sensors 30, such as regularly measuring the ambient temperature.

All usage events are stored by the main device 12 as a usage log on the main device 12 and/or the secondary device 18 (step P3). For example, the usage log is stored in the secure area 43 of the main device 12 to protect it from access by other applications on the main device 12.

In particular, the usage log or parts thereof are not transmitted from the main or secondary device 12, 18 to further devices of the system 10, such as the control system 20. Transmission to other devices which are not part of the system 10 also does not occur.

Using the usage log, the main device 12 can now create usage statistics in step P4.

Usage statistics are also only stored on the main device 12 and/or the secondary device 18, in particular in the secure area 43, and are not transmitted to further devices of the system 10 or outside of the system 10.

The usage statistics correspond to a statistical evaluation of the usage log. In the simplest case, the logged usage events, their number and, if applicable, relations are recorded.

It is however also conceivable that based on the logged usage events conclusions are drawn about the activity carried out by the user U at that time and put in relation to each other.

It is possible to determine in the previously used example of a warehouse worker when the user U has undertaken the activity "picking" as the user moved frequently (many steps and changes of location) and read barcodes of products for the first time. In the same way, the activity "preparing for dispatch" is recognised by comparatively fewer steps, staying in a certain area (packing station) and repeatedly reading barcodes.

Based on this, the statistics can determine the time taken for the different activities "picking" and "preparing for dispatch" and can put these into relation to each other, thus enabling the user U to gain an overview, for example, through the usage statistics on what percentage of the shift the user U spent on each specific activity.

Simple analyses can also be used, such as determining the relation between the different activities of "running", "walking" and "standing" by means of a step counter and determining the movement in the room.

Similarly, it is possible to determine whether and how long the user U stayed in different areas of the warehouse (external area, cooled area, refrigerated area), for example, using the measurements of the ambient temperature.

These determined statistical values are prepared graphically and displayed to the user U on the display 29, 46 of the main device 12 and/or the secondary device 18 (step P5).

It is also conceivable that an acoustic output of the usage statistics is made, for example, through a text-to-speech module connected to a speaker.

Usage statistics can already be produced while logging and permanently updated. It is also conceivable however that the usage statistics are then prepared if the user U requests this through a user input.

It is also conceivable that the main device 12 evaluates the usage log permanently or at regular intervals and outputs cues, for example acoustic, optical and/or haptic cues, itself or through the secondary device 18 to the user U if certain conditions are fulfilled.

For example, a cue can be outputted if the number of usage events of a certain type in the usage log reaches or exceeds a predetermined threshold.

The condition, in this embodiment the threshold, for outputting a cue may be set by the user, for example at the main device or the secondary device.

In addition, or alternatively, the condition or threshold may be set by the control system, for example by a superior or another user of the control system. This way, reminders or positive reinforcement of company guidelines, for example health guidelines, can be managed centrally.

In the example of the warehouse worker, a confirming and encouraging optical and acoustic cue can be outputted, for example, if the tenth positively confirmed reading of the barcode has been made.

The usage log as well as the usage statistics thus contain personalised data of the current user U that is not to be readable by any other user U—for example if the main device 12 and/or the secondary device 18 are used in a subsequent shift by another user U.

For this reason, terminating events are defined which display the end of the use of the system 10 or the main device 12 and/or the secondary device 18 by the current user U or make the end of use probable. These terminating events are recognised by the main device 12 in step P6.

Suitable terminating events are the removal of the secondary device 18 from the holder 52 of the garment 16, the connection of the secondary device 18 and/or the main device 12 to a power supply or the insertion into the charging station 22 and/or the permanent disconnection of the communication link between the main device 12 and the secondary device 18. These are typically executed at the end of the shift.

Also, the inactivity of the secondary device 18 for a predefined period of time as previously described for ending the productive mode can be recognised as a terminating event by the main device 12.

Of course, a corresponding user input of the user U on the secondary device 18 or on the main device 12 can also be used as a terminating event. For example, the user input is the desire to end the productive mode or the statistics mode.

The activation of the sensor unit 44 of the secondary device 18 or at least one of the ambient sensors 30 of the main device 12, in particular the camera 31, can also be regarded as a terminating event.

It is also conceivable that the statistics mode is ended by capturing predetermined sensor data by means of the sensor unit 44 of the secondary device 18 and/or by means of one of the ambient sensors 30 of the main device 12 that then constitutes the terminating event.

For example, the user U reads a predetermined barcode with the sensor unit 44 or the camera 31 to end the statistics mode. This can be the same or another barcode that has been used for activating the statistics mode.

If a terminating event is recognised by the main device 12, then the main device 12 immediately deletes the usage statistics and the usage log from the main device 12 and/or the secondary device 18 completely and securely in step P7. No input or confirmation of the user U is necessary for deletion, and this occurs therefore completely automatically.

In this way, all instances and backups of the usage log and/or the usage statistics are reliably and securely deleted so that they are not readable by other users or the superiors of the user U.

The security of the usage data, i.e., the usage log and the usage statistics, is thus ensured as the data is stored on the one hand only locally on the main device 12 and/or the secondary device 18—in particular in a secure area 43 there—and thus only exists locally. On the other hand, the deletion occurs automatically if the end of the shift or a change of user is recognised or is highly probable. Thus, the system 10, in particular the main device 12 and the secondary device 18, can be used by different users without a problem with regards to data security.

The invention claimed is:

1. A method for operating a system comprising a main device, a secondary device, being at least one of a sensor device or an information device, and a garment for receiving the secondary device,
    wherein the method comprises the following steps:
    a) logging by the main device of usage events triggered on the system in a usage log,
    b) storage of the usage log on at least one of the main device or the secondary device,
    c) creation of usage statistics based on the usage log,
    d) recognition of a terminating event by the main device, said terminating event displaying an end of a current user's use of the system, and
    e) automatic deletion of at least one of the usage log or the usage statistics by the main device if the terminating event has been recognized,
    wherein the secondary device includes a barcode scanner.

2. The method according to claim 1, wherein the user's different activities are recognized using the usage log.

3. The method according to claim 1, wherein the usage statistics include at least one of a time taken by different activities or a relation between the different activities.

4. The method according to claim 1, wherein at least one of the usage log or the usage statistics are stored solely on at least one of the main device or on the secondary device.

5. The method according to claim 1, wherein at least one of the main device or the secondary device output the usage statistics to the user by means of at least one of a display or another output means.

6. The method according to claim 1, wherein the main device is a wearable smart device.

7. The method according to claim 1, wherein a statistics mode of the system is activated to enable logging, wherein the statistics mode is activated at least one of by a user input or automatically if the main device recognizes a start event.

8. The method according to claim 7, wherein the start event is one or several of the following events:
removal of the secondary device or the main device from a charging station of the system,
successful establishment of a communication link of the main device to the secondary device,
actuation of an input means,
activation of the barcode scanner of the secondary device or an ambient sensor of the main device,
capture of predetermined sensor data by at least one of means of the barcode scanner of the secondary device or means of the ambient sensor of the main device,
insertion of the secondary device in a holder of the garment, and
authentication of the user on the main device.

9. The method according to claim 1, wherein the terminating event is one or several of the following events:
connection of at least one of the secondary device or the main device to a power supply,
removal of the secondary device from the garment,
actuation of a user input on the secondary device or the main device which ends at least one of a productive mode or a statistics mode,
activation of the barcode scanner of the secondary device or an ambient sensor of the main device,
capture of predetermined sensor data by at least one of means of the barcode scanner of the secondary device or means of the ambient sensor of the main device,
inactivity of the secondary device for a predefined period of time, and
disconnection of a communication link of the secondary device to the main device permanently.

10. The method according to claim 1, wherein at least one of the usage log or the usage statistics are stored on the main device in a secure area.

11. The method according to claim 1, wherein the secondary device comprises a display on which content is displayed.

12. The method according to claim 1, wherein at least one of the garment or the secondary device comprises at least one input means, wherein at least one function of the secondary device is triggered by actuation of the input means when the secondary device is received in the garment.

13. The method according to claim 1, wherein one of the usage events logged in the usage log is a usage event triggered by a user input.

14. The method according to claim 13, wherein the usage event triggered by the user input is an actuation of the secondary device including the barcode scanner, or a confirmation for sensor data read by the barcode scanner.

15. The method according to claim 1, wherein one of the usage events logged in the usage log is a usage event triggered by at least one of the use of the main device or the secondary device being at least one of a step of the user or a distance travelled by the user.

16. The method according to claim 1, wherein one of the usage events logged in the usage log is an encounter that at least one of the secondary device or the main device detects an encounter with at least one of a smart device, a secondary device or a main device of another system.

17. The method according to claim 1, wherein at least one of the main device or the secondary device output a cue if a number of usage events of a certain type in the usage log fulfil a condition predetermined for this type.

18. The method according to claim 1, wherein the main device establishes a communication link to the secondary device as soon as the secondary device is separated from a power supply.

19. The method according to claim 1, wherein one of the usage events logged in the usage log is a usage event triggered by at least one of the use of the main device or the secondary device or by an automatic usage event.

20. A system with a main device, a secondary device and a garment, on which the secondary device is fastenable, wherein at least one of the main device or the secondary device are configured to execute a method comprising the following steps:
a) logging by the main device of usage events triggered on the system in a usage log,
b) storage of the usage log on at least one of the main device or the secondary device,
c) creation of usage statistics based on the usage log,
d) recognition of a terminating event by the main device, said terminating event displaying an end of the current user's use of the system, and
e) automatic deletion of at least one of the usage log or the usage statistics by the main device if the terminating event has been recognized, wherein the secondary device includes a barcode scanner.

21. The system according to claim 20, wherein the system comprises at least one of a charging station or a control system for at least one of the secondary device or the main device.

* * * * *